UNITED STATES PATENT OFFICE.

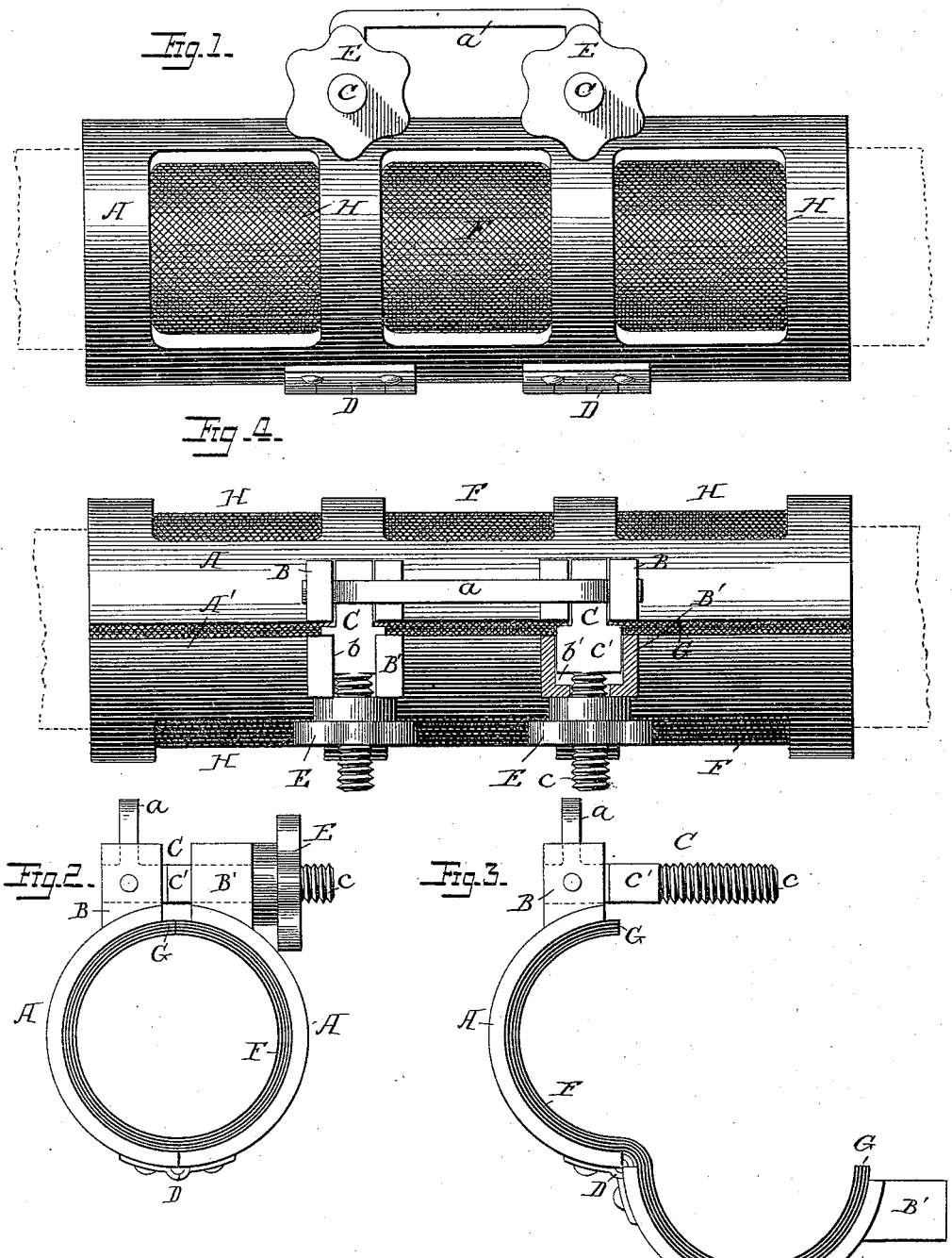

HENRY GERSTUNG, JR., OF ELIZABETH, NEW JERSEY.

HOSE-CLAMP.

SPECIFICATION forming part of Letters Patent No. 447,818, dated March 10, 1891.

Application filed August 7, 1890. Serial No. 361,293. (No model.)

*To all whom it may concern:*

Be it known that I, HENRY GERSTUNG, Jr., a citizen of the United States, residing at Elizabeth, in the county of Union and State of New Jersey, have invented certain new and useful Improvements in Hose-Clamps; and I do hereby declare the following to be a full, clear, and exact description of the invention, such as will enable others skilled in the art to which it appertains to make and use the same.

My invention relates to devices for temporarily stopping leaks in fire-hose; and it consists of a clamp adapted to encircle and be secured upon a hose where the leak occurs, and having certain novel features to be hereinafter pointed out.

In the drawings, Figure 1 is a side view of a hose-clamp embodying my invention. Fig. 2 is an end view thereof in closed position. Fig. 3 is an end view in open position. Fig. 4 is a top view.

Referring to the drawings, A A represent two semi-cylindrical shells or sections, which are hinged together at D D and form the clamp which encircles the hose. This clamp is provided with an elastic lining F of rubber or other suitable material, and preferably of a single piece. The ends of the lining project beyond the outer edges of the shells A for a short distance—about one-quarter of an inch, as shown at G—and when the clamp is applied to a leaky hose it is so arranged thereon that these projecting ends G of the lining are opposed to or over the leak, as I have found that when so arranged and the outer edges of the shells or sections A are drawn together a better and tighter joint is formed and the leak is better stopped.

In order that the parts of the clamp may be drawn together, I provide them with the following parts:

B B are lugs projecting from one of the shells A near its outer edge, and between which are hinged two rods C C, screw-threaded at their outer ends, as at $c$, and having the central expanded or enlarged portions $c'$. These rods C are connected together by a tie-bar $a$, so as to insure their moving in unison.

B' B' are lugs upon the other shell A. They are slotted, as at $b$, and recessed at $b'$, so as to permit the rods C to lie therein when the shells are closed tightly together, as shown in Fig. 4.

E E are nuts engaging with the threaded portions of the rods C and provided with hand-wheels, by which they are operated. The screw-threads on the rods C are "quick" threads, so that the nuts travel rapidly thereon when turned. The inner faces of the nuts bear against the lugs B', and upon being rotated cause the two parts of the clamp to be drawn together, as will be understood.

The advantages which follow from making the rod C with the enlarged portion and forming the lug B' with the recess or socket $b'$ into which the enlarged portion of the rod is drawn by the nut E are that when the two shells are drawn together this arrangement constitutes a lock, preventing the rods C from slipping out of the lugs and the clamp loosening from the hose when the latter is being dragged over the ground or being elevated, for it will be seen that while the slot $b$ is large enough to permit the passage of the portion $c$ of the rod it is not large enough to permit the part $c'$ thereof to pass through it, so that when the part $c'$ has been once drawn into the socket by the nut E it can pass out therefrom only by backing off the nut from the screw, and, further, when the enlarged portion $c'$ has once entered even though but slightly the socket or recess it becomes necessary for the attendant to further give his attention to holding down the rod into its seat in the lug B', and he may then use both hands for turning up the nut E.

The two shells or sections A A have open spaces H formed in them. These, besides lessening the weight of the clamp, also cause it to obtain a better grip upon the hose, which tends to bulge out slightly opposite such open spaces, and hence forces itself tightly against the packing F.

By connecting the two bars C, I insure that they shall move together, and thereby effect a saving of time in the operation of the clamp.

The clamp is simple in construction and can be placed in position upon a hose more readily and more effectively stop leaks therein than any clamp of which I have knowledge.

Without limiting myself to the precise construction and arrangement of the parts shown, what I claim is—

1. A hose-clamp having two semi-cylindrical sections hinged to each other, the two screw-threaded rods hinged to one of the sections and connected by a tie rod or bar, and the nuts upon the rods bearing against lugs upon the other of the sections, substantially as herein described.

2. In a hose-clamp, the combination, with the two semi-cylindrical shells hinged together, of a rod hinged to one of the sections and having a screw-threaded end and an enlarged central portion, the lug B', having the slot b and the recess b', and the nut which engages with the screw-threaded part of the rod and bears against the lug B', substantially as herein described.

3. A hose-clamp having two semi-cylindrical sections hinged together, the two screw-threaded rods hinged to one of the sections and connected by a tie-rod, the slotted lugs with which the said rods engage, the nuts upon the rods, and the elastic lining for the sections of the clamp having its ends projecting beyond the edges of the sections, substantially as set forth.

In testimony whereof I affix my signature in presence of two witnesses.

HENRY GERSTUNG, JR.

Witnesses:
JOHN T. DUNN,
TILGHMAN H. KEIPER.